Aug. 12, 1952  C. J. WESTLING  2,606,454
SCREW DRIVE MECHANISM
Filed June 7, 1951
Fig. 1.
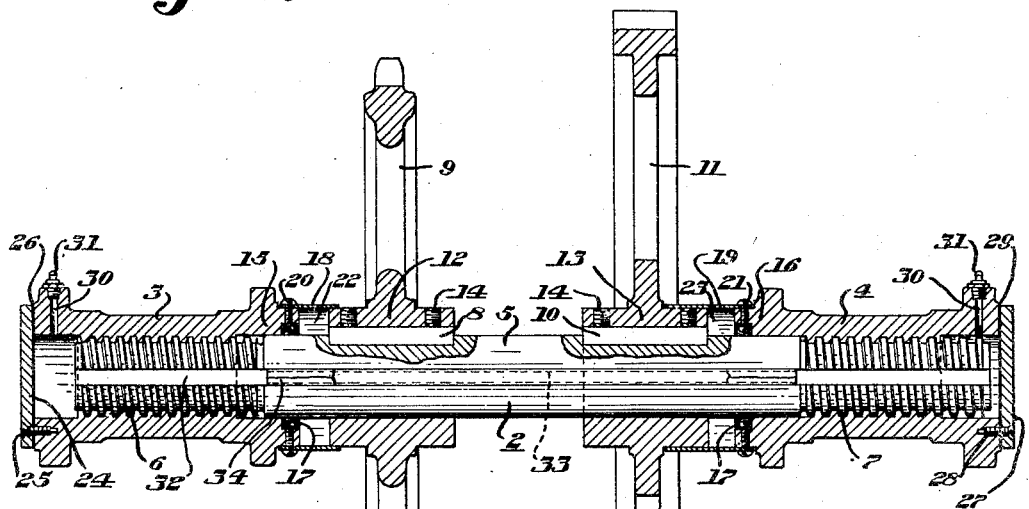
Fig. 3.
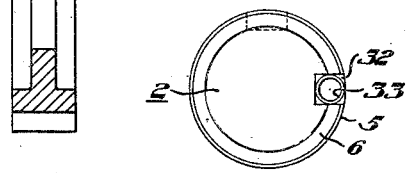
Fig. 2.
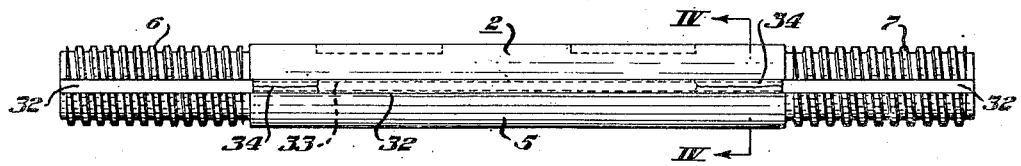
Fig. 5.  Fig. 4.
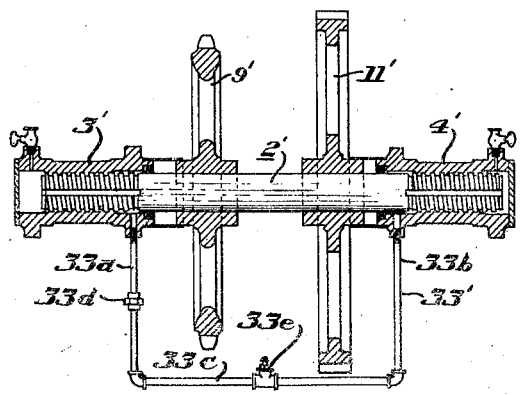
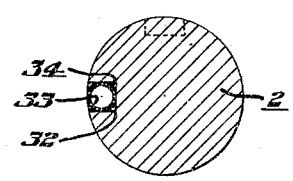
INVENTOR
CARL J. WESTLING Patented Aug. 12, 1952

2,606,454

UNITED STATES PATENT OFFICE 2,606,454

SCREW DRIVE MECHANISM

Carl J. Westling, West Orange, N. J.

Application June 7, 1951, Serial No. 230,331

17 Claims. (Cl. 74—424.8)

This invention relates to screw drive mechanism. It relates particularly to a mechanism comprising a shaft having spaced apart zones having threads of the same hand and nuts on the shaft at said zones having threads meshing with the shaft threads. The invention has to do primarily with the lubrication of such screw drive mechanism.

Screw drive mechanism of the type to which my invention relates has many uses. Normally the shaft having the screw threads thereon at spaced apart zones is rotated by any suitable source of power and the shaft on the one hand and the nuts on the other hand travel relatively axially of the shaft. The threads of the nuts are normally of different lead so that the nuts travel relatively to each other while the shaft is rotating. The nuts are normally held against turning. They may be and normally are connected with a part or parts of the mechanism which is or are to be relatively moved and for the moving of which the screw drive mechanism is provided. One nut may remain stationary while the other moves axially of the shaft or both nuts may move axially while the shaft is rotated. Normally the shaft is free to move axially while it is rotating.

Screw drive mechanisms of the type above referred to are often used where they carry heavy loads and it is important that the threads of the shaft and nuts be adequately lubricated. It is desirable to extend the nuts beyond the ends of the shaft and close the ends of the nuts to retain lubricant. However, this presents a problem since in operation of the mechanism the space within each nut not occupied by the shaft and which is therefore available for containing lubricant varies considerably during operation as the nuts travel back and forth on the shaft. If only an amount of lubricant sufficient to fill the available space within a nut at the time when that space is smallest is employed inadequate lubrication might result. Obviously a greater amount of lubricant could not be employed since at certain times during operation of the mechanism the volume of the lubricant would be greater than the volume of the space within the nut available to contain it and either the mechanism would stall or a part would break.

I have solved the problem by providing a lubricant passage between the lubricant containing spaces within the two nuts. The lubricant may pass back and forth through that passage during operation of the mechanism, thus insuring adequate lubrication of the threads of the shaft and nuts without danger of stalling or damage to the mechanism. Moreover, as the lubricant travels back and forth it adequately lubricates all thread convolutions of both nuts and the threaded shaft portions therewithin.

I preferably provide each of the nuts with an annular axial extension sealed to the shaft intermediate the threaded zones of the shaft and provide a passage the ends of which respectively communicate with the interiors of the respective annular nut extensions so that lubricant within the passage and the nut extensions may pass back and forth as the shaft is turned in its respective directions of rotation to lubricate the shaft and nut threads. Thus a single body of lubricant may be employed for lubricating both threaded zones of the shaft and both nuts. The passage may be in the shaft or outside the shaft.

When, as is normally the case, the threads at the respective threaded zones of the shaft are of unequal lead, the volume of the lubricant containing space is not substantially constant but does not vary a great deal in percentage of the maximum volume of the lubricant containing space and the variation in volume of the lubricant containing space is not great enough to be a detrimental factor. In such a mechanism lubricant is introduced into the lubricant containing spaces in the nuts and into the passage extending between those spaces when the parts are so positioned that the aggregate volume of those spaces is a minimum. A screw drive mechanism in which the threaded shaft portions are of the same hand but of unequal lead has various important uses one of which, for example, is the operation of a goggle valve.

The annular axial extensions of the nuts are preferably disposed about and snugly fit portions of the shaft intermediate the threaded zones and are preferably of such length that a portion of the shaft intermediate said zones is always disposed within each extension in all operative positions of the nuts on the shaft. Annular seals preferably seal the respective nut extensions to the shaft.

The shaft may have hub means thereon at the portion thereof intermediate the threaded zones. A sleeve may cooperate with each of the nuts and a portion of the hub means confining the annular space adjacent the end of each nut between the nut and the hub means to prevent ingress of foreign matter from without. Each sleeve may be connected with one of the nuts and telescoped with a portion of the hub means during operation of the mechanism. The hub means may comprise separate hubs or a continuous hub in the form of a portion of the shaft of enlarged diameter.

The passage when disposed within the shaft is preferably straight and disposed adjacent the periphery of the shaft. I preferably form a longitudinal groove in the outer surface of the shaft intermediate the threaded zones thereof. I desirably employ means forming a peripherally closed passage within the groove and the ends of which respectively communicate with the interiors of the respective annular nut extensions. I may employ a tube within the groove. The tube may be welded in place in the groove. Preferably the tube is welded in place in the groove by welding material adjacent the ends of the tube filling the space between the tube and the groove and completing the periphery of the portions of the shaft sealed to the annular axial extensions of the nuts.

The threaded portions of the shaft preferably have longitudinally extending lubricant ducts communicating with the interiors of the respective annular nut extensions and with the threads to deliver lubricant to the threads throughout said zones. Desirably the outer ends of the nuts project beyond the respective ends of the shaft and are closed.

When the lubricant passage is outside the shaft it preferably clears the portion of the shaft between the nuts sufficiently to provide space at that portion of the shaft for a driving gear. The passage in such case is in the form of a flexible conduit, the flexibility providing for relative travel of the nuts.

Other details, objects and advantages of the invention will become apparent as the following description of certain present preferred embodiments thereof proceeds.

In the accompanying drawings I have shown certain present preferred embodiments of the invention in which:

Figure 1 is an axial cross-sectional view through screw drive mechanism;

Figure 2 is a face view of the shaft of the screw drive mechanism;

Figure 3 is an end view of the shaft as viewed from the left in Figure 2;

Figure 4 is an enlarged transverse cross-sectional view taken on the line IV—IV of Figure 2; and Figure 5 is a diagram showing a modified form of screw drive mechanism.

Referring now more particularly to Figures 1–4, the screw drive mechanism shown thereon comprises essentially a shaft designated generally by reference numeral 2 and two nuts designated respectively by reference numerals 3 and 4. The shaft 2 has a central unthreaded zone 5 and threaded zones 6 and 7 at its ends. The threads at the zone 6 and those at the zone 7 are of the same hand but of somewhat unequal lead. The nut 3 has therein threads meshing with the threads at the zone 6 of the shaft. The nut 4 has therein threads meshing with the threads at the zone 7 of the shaft. Thus when the nuts 3 and 4 are held against rotation while the shaft 2 is turned the nuts 3 and 4 will both move in the same axial direction but at different speeds and depending upon the direction of movement will either gradually approach or gradually recede from each other. Such a mechanism is ideally suited for operation of a goggle or plate valve in which the valve seats move toward and away from each other through a relatively short distance when the valve is being operated.

Keyed to the shaft 2 at 8 is a sprocket wheel 9. Keyed to the shaft 2 at 10 is a gear 11. The sprocket wheel 9 has a hub 12. The gear 11 has a hub 13. The sprocket wheel 9 and gear 11 are held against axial movement relatively to the shaft by screws 14.

Each of the nuts 3 and 4 has an annular axial extension at the inner end thereof. The annular axial extension of the nut 3 is designated 15 while the annular axial extension of the nut 4 is designated 16. Each of the annular axial extensions is disposed about and snugly fits a portion of the shaft intermediate the threaded zones and is of such length that a portion of the shaft intermediate the threaded zones is always disposed therewithin in all operative positions of the nuts on the shaft. The portions of the shaft which enter the respective annular nut extensions 15 and 16 are the ends of the central zone 5 of the shaft. The nut extensions are sealed to the ends of the shaft zone 5 by annular seals 17. The seals 17 prevent movement of lubricant from within the extensions 15 along the outer surface of the shaft toward the center of the shaft.

Fastened to the respective nut extensions 15 and 16 are sleeves 18 and 19 respectively. The sleeves 18 and 19 are both coaxial with the shaft 2, the nuts 3 and 4 and the hubs 12 and 13. The sleeve 18 is fastened to the extension 15 by screws 20. The sleeve 19 is fastened to the extension 16 by screws 21. The sleeve 18 telescopes over the end of the hub 12 nearer the nut 3 during operation of the mechanism. The sleeve 19 telescopes over the end of the hub 13 nearer the nut 4 during operation of the mechanism. The sleeves confine the annular spaces 22 and 23 adjacent the ends of the respective nuts between the nut ends and the respective hubs which are nearer thereto to prevent ingress of foreign matter from without. This is important because during operation of the mechanism the annular spaces 22 and 23 increase and decrease in width. Some very small amounts of lubricant may pass the seals 17 and reach the annular spaces 22 and 23. If foreign matter is allowed ingress into the annular spaces 22 and 23 it may interfere with the proper lubrication of the mechanism.

The outer ends of the nuts 3 and 4 project beyond the respective ends of the shaft 2 so that in all operative positions of the nuts on the shaft the ends of the shaft do not extend axially as far as the outer ends of the nuts. The outer ends of the nuts are close. The outer end of the nut 3 is closed by a closure plate 24 held in place by screws 25. A gasket 26 is compressed between the end of the nut and the closure plate. The outer end of the nut 4 is closed by a closure plate 27 held in place by screws 28. A gasket 29 is compressed between the end of the nut and the closure plate. Each of the nuts has an opening through which lubricant may be introduced thereinto. The respective openings are shown at 30. Each of the openings 30 is closed by a fitting 31 which may be a grease fitting through which grease may be introduced under pressure by a grease gun. Alternatively the openings 30 may have removable closure plugs adapted to be removed when lubricant is to be introduced.

Referring now more particularly to Figures 2, 3 and 4, the shaft has throughout its entire length a groove 32 milled thereto and similar to a keyway. The groove 32 extends not only through the central zone 5 of the shaft 2 but also through the threaded zones 6 and 7. Disposed in the portion of the groove 32 at the central zone 5 of the shaft 2 is a tube 33. The tube 33 is of such diameter that it does not project beyond the periphery of the portion 5 of the shaft 2. The tube 33 is preferably maintained in the groove 32 by bonding, e. g., welding, brazing, silver soldering, etc. Desirably the tube 33 is bonded in place in the groove 32 by bonding material 34 adjacent the ends of the tube filling the space between the tube and the groove and completing the periphery of the portions of shaft 2 which are sealed to the annular axial extensions of the nuts by the annular seals 17. It is not necessary thus to finish the part of the zone 5 of the shaft which is always disposed intermediate the seals 17. Thus where the shaft passes through the seals 17 it is solid completely across except for the interior of the tube 33 and has a completely circular exterior cooperating with the seals.

Lubricant is introduced through either or both of the openings 30 to lie within the portion of the nuts 3 and 4 not occupied by the threaded zones 6 and 7 of the screw and also within the portions of the groove 32 in the threaded zones 6 and 7 of the shaft and within the tube 33. The portions of the groove 32 in the threaded zones 6 and 7 of the shaft communicate with the threads to deliver lubricant to the threads throughout said zones.

In operation when the shaft 2 moves toward the left viewing Figure 1 relatively to the nuts 3 and 4 the lubricant containing space within the nut 3 is decreased and the lubricant containing space within the nut 4 is increased. Lubricant automatically flows from left to right through the portions of the groove 32 in the zones 6 and 7 of the shaft and through tube 33 so that a substantial amount of lubricant can always be maintained within the mechanism and the threads of the shaft at both ends thereof and the threads of the nuts cooperating therewith are always completely and efficiently lubricated. When the shaft 2 moves back toward the right relatively to the nuts viewing Figure 1 the lubricant will automatically flow back from right to left and accomplish its function.

Figure 5 is a diagram showing a modified form of screw drive mechanism in which parts corresponding to parts shown in Figures 1–4 are designated by the same respective reference numerals each with a prime affixed. The difference between the structure of Figures 1–4 on the one hand and that of Figure 5 on the other hand is that in Figure 5 the passage between the nuts 3' and 4' is outside and separate from the shaft 2'. The passage is provided by a conduit designated generally by reference numeral 33' and constituting a portion 33a communicating with the interior of the nut 3', a portion 33b communicating with the interior of the nut 4' and a connecting portion 33c extending between and communicating with the portions 33a and 33b. For ease of assembly and disassembly a union 33d may be provided in the portion 33a. A grease fitting 33e may be provided in the portion 33c. The portion 33c extends generally parallel to the axis of the shaft 2' and is substantially spaced therefrom to provide clearance for a driving gear to be mounted on the shaft between the portions 33a and 33b. The conduit 33' is flexible. The flexibility may be simply the inherent flexibility of the conduit members sufficient to allow for relative movement of the nuts or special flexible conduit may be employed.

While I have shown and described certain present preferred embodiments of the invention it is to be distinctly understood that the invention is not limited thereto but may be otherwise variously embodied within the scope of the following claims.

I claim:

1. Screw drive mechanism comprising a shaft having spaced apart zones having threads of the same hand and nuts on the shaft at said zones having threads meshing with the shaft threads, each of the nuts having an annular axial extension extending beyond the nearer end of the shaft and transversely closed and also having an annular axial extension sealed to the shaft intermediate said zones, the mechanism having a passage the ends of which respectively communicate with the interiors of the respective nuts so that lubricant within the passage and the nuts may pass back and forth as the shaft is turned in its respective directions of rotation to lubricate the shaft and nut threads.

2. Screw drive mechanism comprising a shaft having spaced apart zones having threads of the same hand and nuts on the shaft at said zones having threads meshing with the shaft threads, each of the nuts having an annular axial extension extending beyond the nearer end of the shaft and transversely closed and also having an annular axial extension sealed to the shaft intermediate said zones, the shaft having a passage therethrough the ends of which respectively communicate with the interiors of the respective nuts so that lubricant within the passage and the nuts may pass back and forth as the shaft is turned in its respective directions of rotation to lubricate the shaft and nut threads.

3. Screw drive mechanism comprising a shaft having spaced apart zones having threads of the same hand and nuts on the shaft at said zones having threads meshing with the shaft threads, each of the nuts having an annular axial extension extending beyond the nearer end of the shaft and transversely closed and also having an annular axial extension disposed about and snugly fitting a portion of the shaft intermediate said zones and of such length that a portion of the shaft intermediate said zones is always disposed within the latter-mentioned extension in all operative positions of the nuts on the shaft, the shaft having a passage therethrough the ends of which respectively communicate with the interiors of the respective nuts so that lubricant within the passage and the nuts may pass back and forth as the shaft is turned in its respective directions of rotation to lubricate the shaft and nut threads.

4. Screw drive mechanism comprising a shaft having spaced apart zones having threads of the same hand, nuts on the shaft at said zones having threads meshing with the shaft threads, each of the nuts having an annular axial extension extending beyond the nearer end of the shaft and transversely closed and also having an annular axial extension disposed about a portion of the shaft intermediate said zones and of such length that a portion of the shaft intermediate said zones is always disposed within the latter-mentioned extension in all operative positions of the nuts on the shaft, and annular seals sealing the respective latter-mentioned nut extensions to the shaft, the shaft having a passage therethrough the ends of which respectively communicate with the interiors of the respective nuts so that lubricant within the passage and the nuts may pass back and forth as the shaft is turned in its respective directions of rotation to lubricate the shaft and nut threads.

5. Screw drive mechanism comprising a shaft having spaced apart zones having threads of the same hand, nuts on the shaft at said zones having threads meshing with the shaft threads, each of the nuts having an annular axial extension extending beyond the nearer end of the shaft and transversely closed and also having an annular axial extension disposed about and snugly fitting a portion of the shaft intermediate said zones, the shaft having a passage therethrough the ends of which respectively communicate with the interiors of the respective nuts so that lubricant within the passage and the nuts may pass back and forth as the shaft is turned in its respective directions of rotation to lubricate the shaft and nut threads, the shaft having hub means thereon at the portion thereof intermediate said zones, and a sleeve cooperating with each of the nuts and a portion of the hub means confining the annular space adjacent the end of each nut between the nut and the hub means to prevent ingress of foreign matter from without.

6. Screw drive mechanism comprising a shaft having spaced apart zones having threads of the same hand, nuts on the shaft at said zones having threads meshing with the shaft threads, each of the nuts having an annular axial extension extending beyond the nearer end of the shaft and transversely closed and also having an annular axial extension disposed about and snugly fitting a portion of the shaft intermediate said zones, the shaft having a passage therethrough the ends of which respectively communicate with the interiors of the respective nuts so that lubricant within the passage and the nuts may pass back and forth as the shaft is turned in its respective directions of rotation to lubricate the shaft and nut threads, the shaft having hub means thereon at the portion thereof intermediate said zones, and a sleeve connected with each of the nuts and telescoping with a portion of the hub means during operation of the mechanism confining the annular space adjacent the end of each nut between the nut and the hub means to prevent ingress of foreign matter from without.

7. Screw drive mechanism comprising a shaft having spaced apart zones having threads of the same hand and nuts on the shaft at said zones having threads meshing with the shaft threads, each of the nuts having an annular axial extension extending beyond the nearer end of the shaft and transversely closed and also having an annular axial extension sealed to the shaft intermediate said zones, the shaft having a straight passage therethrough adjacent the periphery thereof the ends of which respectively communicate with the interiors of the respective nuts so that lubricant within the passage and the nuts may pass back and forth as the shaft is turned in its respective directions of rotation to lubricate the shaft and nut threads.

8. Screw drive mechanism comprising a shaft having spaced apart zones having threads of the same hand, nuts on the shaft at said zones having threads meshing with the shaft threads, each of the nuts having an annular axial extension extending beyond the nearer end of the shaft and transversely closed and also having an annular axial extension sealed to the shaft intermediate said zones, the shaft having a longitudinal groove in its outer surface intermediate said zones, and means forming a peripherally closed passage within said groove the ends of which respectively communicate with the interiors of the respective nuts so that lubricant within the passage and the nuts may pass back and forth as the shaft is turned in its respective directions of rotation to lubricate the shaft and nut threads.

9. Screw drive mechanism comprising a shaft having spaced apart zones having threads of the same hand, nuts on the shaft at said zones having threads meshing with the shaft threads, each of the nuts having an annular axial extension extending beyond the nearer end of the shaft and transversely closed and also having an annular axial extension sealed to the shaft intermediate said zones, the shaft having a longitudinal groove in its outer surface intermediate said zones, and a tube within the groove the ends of which respectively communicate with the interiors of the respective nuts so that lubricant within the tube and the nuts may pass back and forth as the shaft is turned in its respective directions of rotation to lubricate the shaft and nut threads.

10. Screw drive mechanism comprising a shaft having spaced apart zones having threads of the same hand, nuts on the shaft at said zones having threads meshing with the shaft threads, each of the nuts having an annular axial extension extending beyond the nearer end of the shaft and transversely closed and also having an annular axial extension sealed to the shaft intermediate said zones, the shaft having a longitudinal groove in its outer surface intermediate said zones, and a tube within the groove the ends of which respectively communicate with the interiors of the respective nuts so that lubricant within the tube and the nuts may pass back and forth as the shaft is turned in its respective directions of rotation to lubricate the shaft and nut threads, the tube being welded in place in the groove.

11. Screw drive mechanism comprising a shaft having spaced apart zones having threads of the same hand, nuts on the shaft at said zones having threads meshing with the shaft threads, each of the nuts having an annular axial extention extending beyond the nearer end of the shaft and transversely closed and also having an annular axial extension sealed to the shaft intermediate said zones, the shaft having a longitudinal groove in its outer surface intermediate said zones, and a tube within the groove the ends of which respectively communicate with the interiors of the respective nuts so that lubricant within the tube and the nuts may pass back and forth as the shaft is turned in its respective directions of rotation to lubricate the shaft and nut threads, the tube being welded in place in the groove by welding material adjacent the ends of the tube filling the space between the tube and the groove and completing the periphery of the portions of the shaft sealed to the latter-mentioned annular axial extensions of the nuts.

12. Screw drive mechanism comprising a shaft having spaced apart zones having threads of the same hand and nuts on the shaft at said zones having threads meshing with the shaft threads, each of the nuts having an annular axial extension extending beyond the nearer end of the shaft and transversely closed and also having an annular axial extension sealed to the shaft intermediate said zones, the shaft having a passage therethrough the ends of which respectively communicate with the interiors of the respective nuts so that lubricant within the passage and the nuts may pass back and forth as the shaft is turned in its respective directions of rotation to lubricate the shaft and nut threads, the threaded portions of the shaft having longitudinally extending lubricant ducts communicating with the interiors of the respective annular nut extensions and with the threads to deliver lubricant to the threads throughout said zones.

13. Screw drive mechanism comprising a shaft having spaced apart zones having threads of the same hand and nuts on the shaft at said zones having threads meshing with the shaft threads, each of the nuts having an annular axial extension sealed to the shaft intermediate said zones, the shaft having a passage therethrough the ends of which respectively communicate with the interiors of the respective annular nut extensions so that lubricant within the passage and the nut extensions may pass back and forth as the shaft is turned in its respective directions of rotation to lubricate the shaft and nut threads, the outer ends of the nuts projecting beyond the respective ends of the shaft and being closed, the threaded portions of the shaft having longitudinally extending lubricant ducts communicating with the interiors of the respective annular nut extensions and with the threads to deliver lubricant to the threads throughout said zones.

14. Screw drive mechanism comprising a shaft having spaced apart zones having threads of the same hand, nuts on the shaft at said zones having threads meshing with the shaft threads, each of the nuts having an annular axial extension disposed about a portion of the shaft intermediate said zones and of such length that a portion of the shaft intermediate said zones is always disposed within the extension in all operative positions of the nuts on the shaft, annular seals sealing the respective nut extensions to the shaft, the shaft having a longitudinal groove in its outer surface intermediate said zones, and a tube within the groove the ends of which respectively communicate with the interiors of the respective annular nut extensions so that lubricant within the tube and the nut extensions may pass back and forth as the shaft is turned in its respective directions of rotation to lubricate the shaft and nut threads, the tube being bonded in place in the groove by bonding material adjacent the ends of the tube filling the space between the tube and the groove and completing the periphery of the portions of the shaft with which the annular seals cooperate, the outer ends of the nuts projecting beyond the respective ends of the shaft and being closed, the threaded portions of the shaft having longitudinally extending lubricant ducts communicating with the interiors of the respective annular nut extensions and with the threads to deliver lubricant to the threads throughout said zones.

15. Screw drive mechanism comprising a shaft having spaced apart zones having threads of the same hand and nuts on the shaft at said zones having threads meshing with the shaft threads, each of the nuts having an annular axial extension extending beyond the nearer end of the shaft and transversely closed and also having an annular axial extension sealed to the shaft intermediate said zones, the mechanism having a passage outside and separate from the shaft the ends of which respectively communicate with the interiors of the respective nuts so that lubricant within the passage and the nuts may pass back and forth as the shaft is turned in its respective directions of rotation to lubricate the shaft and nut threads.

16. Screw drive mechanism comprising a shaft having spaced apart zones having threads of the same hand and nuts on the shaft at said zones having threads meshing with the shaft threads, each of the nuts having an annular axial extension extending beyond the nearer end of the shaft and transversely closed and also having an annular axial extension sealed to the shaft intermediate said zones, and a conduit outside and separate from the shaft ends of which respectively communicate with the interiors of the respective nuts so that lubricant within the conduit and the nuts may pass back and forth as the shaft is turned in its respective directions of rotation to lubricate the shaft and nut threads, a portion of the conduit opposite a portion of the shaft intermediate the nuts being substantially spaced from the shaft to provide clearance for a driving gear to be mounted on that portion of the shaft.

17. Screw drive mechanism comprising a shaft having spaced apart zones having threads of the same hand and nuts on the shaft at said zones having threads meshing with the shaft threads, each of the nuts having an annular axial extension extending beyond the nearer end of the shaft and transversely closed and also having an annular axial extension sealed to the shaft intermediate said zones, and a flexible conduit outside and separate from the shaft the ends of which respectively communicate with the interiors of the respective nuts so that lubricant within the conduit and the nuts may pass back and forth as the shaft is turned in its respective directions of rotation to lubricate the shaft and nut threads.

CARL J. WESTLING.

No references cited.